US011857986B2

(12) United States Patent
Lee

(10) Patent No.: US 11,857,986 B2
(45) Date of Patent: Jan. 2, 2024

(54) TUBELESS DISPENSER CONTAINER

(71) Applicant: SAMHWA CO., LTD, Uiwang-si (KR)

(72) Inventor: Kyungchang Lee, Uiwang-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 3 days.

(21) Appl. No.: 17/834,857

(22) Filed: Jun. 7, 2022

(65) Prior Publication Data

US 2023/0112709 A1 Apr. 13, 2023

(30) Foreign Application Priority Data

Oct. 8, 2021 (KR) ........................ 10-2021-0134341

(51) Int. Cl.
*B05B 11/10* (2023.01)
*A45D 34/00* (2006.01)

(52) U.S. Cl.
CPC .......... *B05B 11/1046* (2023.01); *A45D 34/00* (2013.01); *B05B 11/1098* (2023.01); *A45D 2200/056* (2013.01)

(58) Field of Classification Search
CPC ............. B05B 11/1046; B05B 11/1098; B05B 11/1074; B05B 11/1077; B05B 11/0032; B05B 11/0038; B05B 11/0044; B05B 11/1032; B05B 11/1047; B05B 15/30; B05B 11/0037; B05B 11/1001; A45D 34/00; A45D 2200/056
See application file for complete search history.

(56) References Cited

U.S. PATENT DOCUMENTS 5,303,851 A * 4/1994 Libit ................. B05B 11/00442 222/207
5,638,994 A * 6/1997 Libit ..................... G01F 11/084 222/215
7,490,743 B2 * 2/2009 Herzog ................. G01F 11/028 222/321.7
8,038,040 B2 * 10/2011 Dennis .................... B05B 15/30 222/464.1
8,297,479 B2 * 10/2012 Hoefing .............. B05B 11/0037 222/383.3

(Continued)

FOREIGN PATENT DOCUMENTS

KR 10-2011-0139385 A 12/2011
KR 10-2013-0068276 A 6/2013

(Continued)

*Primary Examiner* — Vishal Pancholi
(74) *Attorney, Agent, or Firm* — Park, Kim & Suh, LLC

(57) ABSTRACT

A tubeless dispenser container is disclosed, which includes: a bottle part in which the filling space is formed and in an upper surface of which a supply hole for allowing a flow of the content and an air hole for allowing an inflow of air are formed; a connector part that is coupled to an upper portion of the bottle part to spatially separate the supply hole from the air hole; and a pump part that is secured to a designated position of the connector part and is configured to suction and dispense the content supplied through the supply hole, where the bottle part has a hollow channel part formed on an inner wall thereof at one side, with the channel part having one end opening to a lower portion of the filling space and the other end opening to an upper portion of the filling space.

10 Claims, 10 Drawing Sheets

(56) References Cited

U.S. PATENT DOCUMENTS

| | | | | |
|---|---|---|---|---|
| 8,408,430 | B2 * | 4/2013 | Dennis | B05B 11/001 222/530 |
| 8,881,953 | B2 * | 11/2014 | Dennis | B05B 11/0037 239/333 |
| 9,878,834 | B2 * | 1/2018 | Azelton | B65D 47/0814 |
| 10,124,357 | B2 * | 11/2018 | Good | B05B 11/0089 |
| 2010/0096414 | A1 * | 4/2010 | Dennis | B05B 15/30 239/526 |
| 2015/0090739 | A1 * | 4/2015 | Jung | B05B 11/1074 222/256 |

FOREIGN PATENT DOCUMENTS

| | | | |
|---|---|---|---|
| KR | 10-2021064 | B1 | 9/2019 |
| KR | 10-2020-0111351 | A | 9/2020 |

* cited by examiner

TUBELESS DISPENSER CONTAINER

CROSS-REFERENCE TO RELATED APPLICATIONS

This application claims the benefit of Korean Patent Application No. 10-2021-0134341, filed with the Korean Intellectual Property Office on Oct. 8, 2021, the disclosure of which is incorporated herein by reference in its entirety.

BACKGROUND

1. Technical Field

The present invention relates to a dispenser container equipped with a pump, more particularly to a tubeless dispenser container that is capable of dispensing a content in a stable manner even without using a plastic tube.

2. Description of the Related Art

In a cosmetic container, etc., that holds a liquid or gel content such as a perfume, etc., a pump may be coupled to an upper opening of the container to dispense a fixed amount of content to the exterior. A user who wishes to dispense a liquid content may press down on a nozzle corresponding to a button, upon which the content that was previously drawn into the pump may be pressurized, moved up along the discharge path, and subsequently dispensed through the nozzle. When the user removes the pressure on the nozzle, the discharge path may be mechanically closed by the rising of the nozzle, causing a decrease in pressure inside the pump, and the content may again be drawn from the container to compensate for the pressure decrease.

Such a pump is being used for dispensing a variety of contents, including not only perfumes and cosmetics but also air fresheners, insecticides, and others. In particular, the pump is growing in demand due to its convenient use, as a fixed amount of content can be dispensed by a single pressing of the nozzle, and the content is prevented from leaking to the outside.

Generally, in order to dispense a content from a container body holding the content, a pump may be connected to a long plastic tube, with the lower end of the tube touching the bottom surface of the container body. The suctioning force of the pump may be applied on the inside of the tube, allowing the content held in the container body to be drawn in through the tube and into the pump. While such a tube makes it possible to completely use up the content held in the container body, the tube is inserted into the interior of the container body and may be visible from the outside, whereby the overall aesthetic of the container may be lowered. The issue of lowered aesthetic may be especially problematic when the container corresponds to a cosmetic container. In such cases, the container equipped with a pump may often have the container body fabricated from an opaque material, in order that the tube may not be seen from the outside.

SUMMARY OF THE INVENTION

An aspect of the present invention, which was conceived to resolve the problem described above, is to provide a tubeless dispenser container that is capable of dispensing a content in a stable manner without using a plastic tube.

Other objectives of the present invention will be more clearly understood from the embodiments set forth below.

A tubeless dispenser container according to one aspect of the invention is a tubeless dispenser container for dispensing a content held in a filling space and includes: a bottle part in which the filling space is formed and in an upper surface of which a supply hole for allowing a flow of the content and an air hole for allowing an inflow of air are formed; a connector part that is coupled to an upper portion of the bottle part to spatially separate the supply hole from the air hole; and a pump part that is secured to a designated position of the connector part and is configured to suction and dispense the content supplied through the supply hole, where the bottle part has a hollow channel part formed on an inner wall thereof at one side, with the channel part having one end opening to a lower portion of the filling space and the other end opening to an upper portion of the filling space.

A tubeless dispenser container according to an embodiment of the present invention can include one or more of the following features. For example, the bottle part can include: a bottle body, which may form the filling space, have an open bottom, and have the channel part formed on one side; and a base, which may be configured to be coupled to the open bottom of the bottle body, where a gap may be formed between a lower entrance of the channel part and an inside lower surface of the base when the base is coupled to the bottom of the bottle body.

In certain embodiments, the lower entrance of the channel part can be formed in a side surface of the channel part. In certain embodiments, the inside lower surface of the base can have a downward incline towards the one side where the lower entrance of the channel part is formed. Also, in certain embodiments, the base can be rotatably coupled to the open bottom of the bottle body, the base can have a protruding curb of an upwardly protruding shape formed along an edge of the inside lower surface, with the protruding curb having one or more inflow indentations in designated positions thereof where the protruding curb does not protrude upward from the inside lower surface of the base, so that, while the base is rotatably coupled to the open bottom of the bottle body, either the protruding curb closes the lower entrance of the channel part or the inflow indentation connects the lower entrance of the channel part with the filling space, depending on the rotated angle of the base.

The bottle part can include an airduct protrusion, which may protrude upward in a particular length from the upper surface of the bottle part and form a channel connecting with the air hole in its inside, while the connector part can include an insertion cavity, which may be configured to receive the airduct protrusion force-fitted therein such that the insertion cavity contacts the outer perimeter of the airduct protrusion in an airtight manner. In this case, while the connector part is coupled to the upper portion of the bottle part, a bottom surface of the connector part can be at least partially separated from the upper surface of the bottle part such that the content flowed out of the supply hole may be supplied to the pump part through a space between the connector part and the bottle part.

The bottle part can include a mounting rim, which may have an annular shape and may protrude upward in a particular length from the upper surface of the bottle part, and the connector part can be configured to have a portion thereof force-fitted into an inner side of the mounting rim so as to contact the inner perimeter of the mounting rim in an airtight manner. In certain embodiments, the connector part can include an inner cap and a pump cap, where the inner cap can be configured to be force-fitted into the inner side of the mounting rim so as to contact the inner perimeter of the mounting rim in an airtight manner, and the pump cap can be configured to be mounted onto an outer side of the mounting rim to contact the outer perimeter of the mounting rim in an airtight manner.

An embodiment of the present invention having the features above can provide various advantageous effects including the following. However, an embodiment of the present invention may not necessarily exhibit all of the effects below.

An embodiment of the invention can provide a tubeless dispenser container where the structure of the dispenser container itself not only provides a supply path for the content but also effectively separates the supply path of the content from the flow path of the air, so that the tubeless dispenser container is able to dispense the content in a stable manner even without a plastic tube that connects to the pump part.

DETAILED DESCRIPTION OF THE INVENTION

Figure 1:
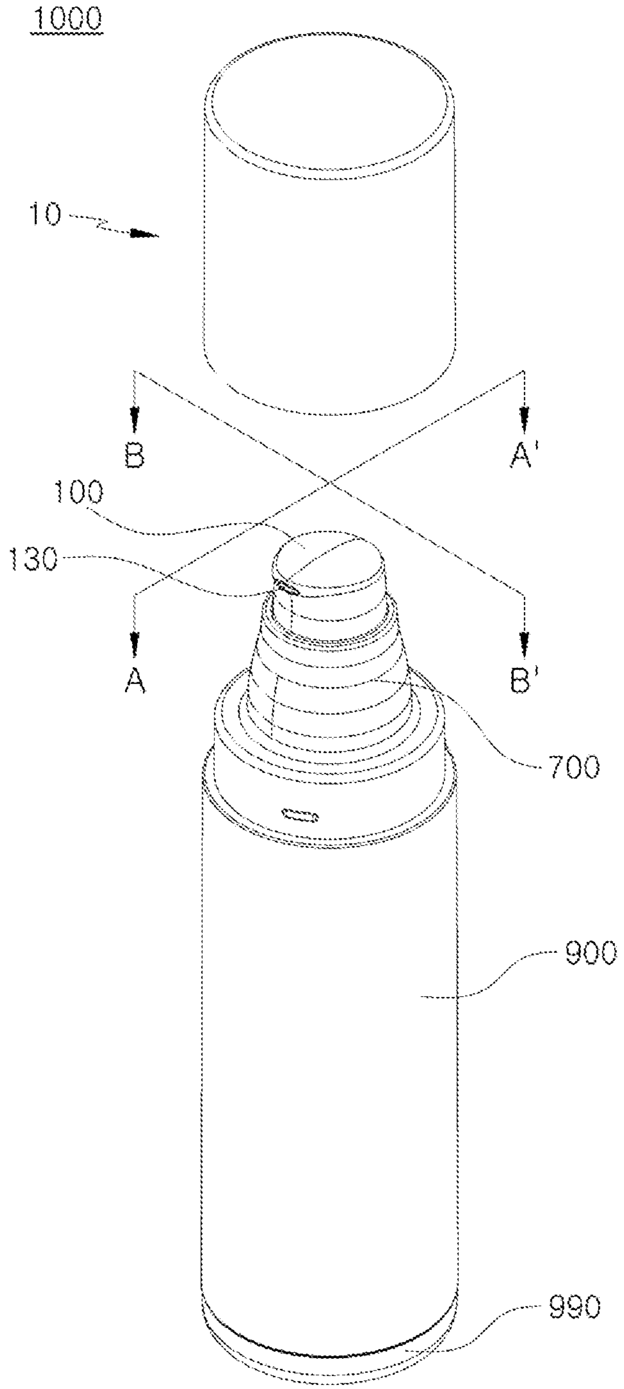
FIG. 1 is a perspective view illustrating a tubeless dispenser container according to a first disclosed embodiment of the invention with the overcap separated.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

Figure 2:
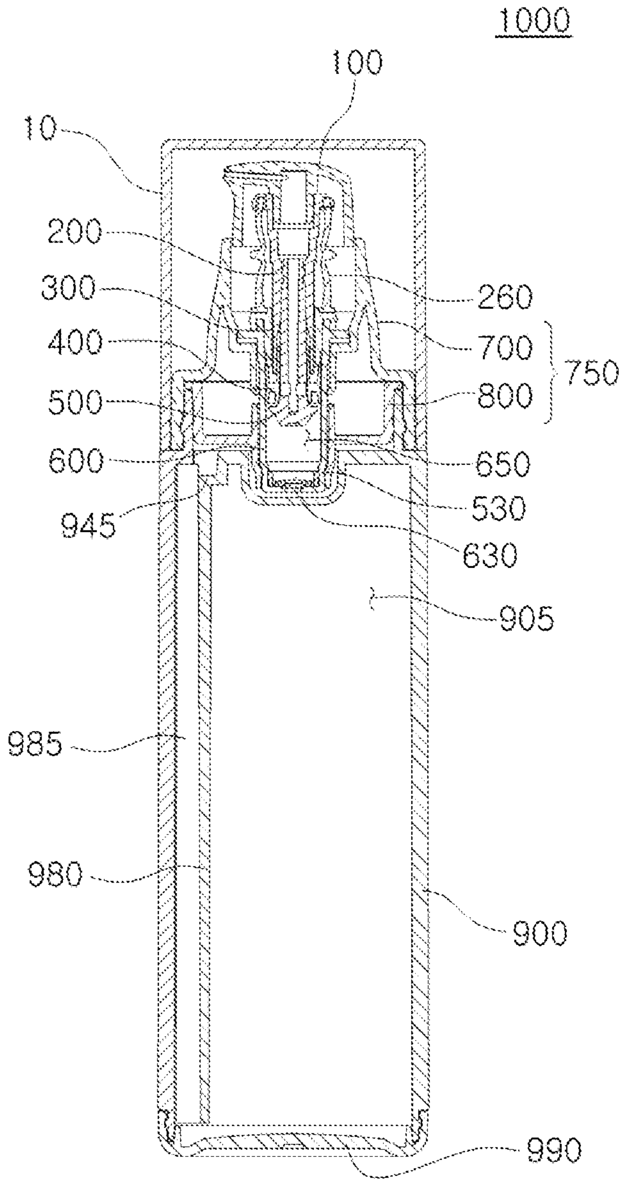
FIG. 2 is a cross-sectional view of the tubeless dispenser container illustrated in FIG. 1 as cut across line A-A'.
Figure 3:
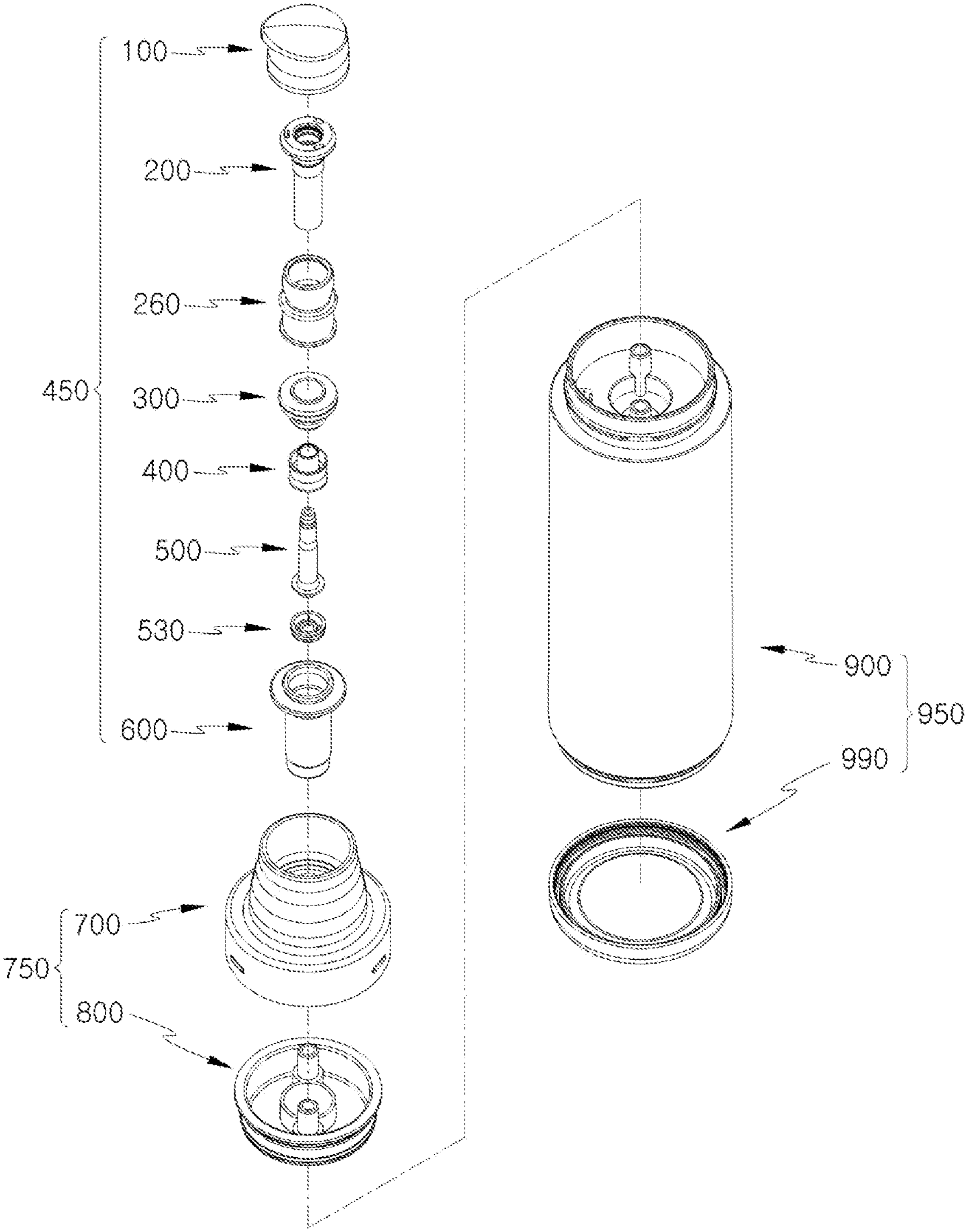
FIG. 3 is an exploded perspective view of the tubeless dispenser container illustrated in FIG. 1.

FIG. 1 is a perspective view of a tubeless dispenser container 1000 according to an embodiment of the invention with the overcap 10 separated, FIG. 2 is a cross-sectional view of the tubeless dispenser container 1000 illustrated in FIG. 1 across line A-A', and FIG. 3 is an exploded perspective view of the tubeless dispenser container 1000 illustrated in FIG. 1.

Referring to FIGS. 1 to 3, a tubeless dispenser container 1000 according to an embodiment of the invention can be a container for dispensing a content (not shown) held within a filling space 905 and can mainly include a bottle part 950, a connector part 750, and a pump part 450.

The bottle part 950 can have the filling space 905 formed in its interior and can have a supply hole 945, for permitting the flow of the content, and air holes 965, for permitting the inflow of air, formed in its upper surface. A channel part 980 can also be formed on the inner wall on one side of the bottle part 950, where the channel part 980 can have a hollow space within to form a bottle channel 985. One end of the bottle channel 985 can be formed at a lower portion of the filling space 905, while the other end of the bottle channel 985 can be formed at an upper portion of the filling space 905 to be connected with the supply hole 945. When there is a content (not shown) filled in the filling space 905, the air holes 965 can be positioned above the surface of the content (not shown), whereas the one end of the bottle channel 985 can be positioned below the surface of the content (not shown), with respect to the surface of the liquid phase or gel phase content (not shown).

The connector part 750 can be coupled to an upper portion of the bottle part 950 and can serve to provide a space for placing the pump part 450 and designate the position of the pump part 450 while at the same time spatially separating the supply hole 945 and the air holes 965 of the bottle part 950.

The pump part 450 can be secured to the designated position of the connector part 750 to suction and dispense the content (not shown) supplied through the supply hole 945. That is, after removing the overcap 10, when the user presses the nozzle 100, the pump guide 500 may move down to open the pump inflow holes 540, allowing the content within the pump space 650 to enter the pump inflow holes 540, pass through the guide passage 550, valve space 250, nozzle space 150, and nozzle passage 140, and ultimately be dispensed through the dispensing hole 130.

With a tubeless dispenser container 1000 according to an embodiment of the invention, the bottle part 950 itself can provide a supply channel, obviating the need for a plastic tube as in the prior art. This can resolve the problem of the dispenser container 1000 having a lowered aesthetic due to the crude plastic tube of the interior being visible, even when the bottle part 950 is fabricated from a transparent material.

In a dispenser container that utilizes a pump, suctioning the content requires that the air pressure inside the filling space 905 be kept at a certain level and the pressure at the pump side be kept lower than the air pressure inside the filling space 905. In cases where a plastic tube is connected directly to the pump as in the prior art, such negative pressure can be easily formed simply by increasing the airtightness of the pump itself. However, in cases where the supply channel is formed by coupling several components together as in an embodiment of the invention, it is very important to provide an airtight seal between the portions requiring a negative pressure and the portions kept at a normal pressure.

A more detailed description of an embodiment of the invention is provided below with reference to FIG. 3. A tubeless dispenser container 1000 according to an embodiment of the invention can include the pump part 450, connector part 750, and bottle part 950, as well as an overcap 10 that may be detachably coupled onto the upper portion. Here, the pump part 450 can include a nozzle 100, a valve 200, an elastic element 260, a housing cover 300, a piston 400, a guide 500, a disk 530, and a housing 600; the connector part 750 can include a pump cap 700 and an inner cap 800; and the bottle part 950 can include a bottle body 900 and a base 990.

The nozzle 100 can correspond to the portion that may be pressed by the user and may dispense the content correspondingly. The nozzle 100 can be open at the bottom and can have the dispensing hole 130 formed in one side. The nozzle 100 can have a space formed therein, defined by an outer edge 110, and can have a connecting boss 120 formed on an inner side of the outer edge 110. The connecting boss 120 can have a cylindrical shape with an open bottom and can form a nozzle space 150 therein.

A nozzle passage 140 can be formed in an upper portion of the nozzle 100, where the nozzle passage 140 can have one end connecting to the nozzle space 150 and the other end continuing to the dispensing hole 130. The connecting boss 120 of the nozzle 100 can be inserted into a connecting part 230 of the valve 200 to be coupled and secured onto the valve 200. When the nozzle 100 is moved up and down together with the valve 200, the outer edge 110 of the nozzle 100 can move along the inner perimeter of the inner mounting part 720 of the pump cap 700.

The valve 200 can be coupled to the nozzle 100 and the guide 500 and can manipulate the piston 400 and guide 500 by way of the force applied by the user and the restoring force of the elastic element 260. The valve 200 can have a hollow cylindrical shape overall and can include a head part 210, a connecting part 230, and a cylinder part 240.

The head part 210 can protrude outwardly from the upper end of the valve 200 and extend downward so as to form a connection groove 220. An upper portion 270 of the elastic element 260 can be inserted in and secured to the connection groove 220.

The nozzle 100 and the valve 200 can be coupled to each other, as the connecting boss 120 of the nozzle 100 is inserted into the connecting part 230. As shown in the drawings, a curb can be formed on each of the connecting boss 120 and the connecting part 230, and the curbs can be configured to contact each other, so that when the nozzle 100 is pressed down, the valve 200 can be pressed downward by the nozzle 100, and when the valve 200 is moved up, the nozzle 100 can be pressed upward by the valve 200. It would be possible to couple the connecting boss 120 and the connecting part 230 more securely by forming a protrusion and an indentation configured to mate with each other on the outer perimeter of the connecting boss 120 and the inner perimeter of the connecting part 230. When the connecting boss 120 is inserted into the connecting part 230, the valve space 250 of the valve 200 can connect with the nozzle space 150 of the nozzle 100.

The cylinder part 240 can be configured in the shape of a hollow cylinder. A stem 520 of the guide 500 can be inserted into the interior space of the cylinder part 240, and as such, the interior space of the cylinder part 240 can have an inner diameter corresponding to the outer diameter of the stem 520. However, at a lower portion of the interior space of the cylinder part 240, an inner contact part 430 of the piston 400 can also be inserted, and the interior space of the cylinder part 240 can have a larger inner diameter at the lower portion correspondingly. It would be possible to couple the valve 200 and the guide 500 more securely by forming a coupling protrusion 245 on the inner perimeter of the cylinder part 240 and a corresponding indentation in the outer perimeter of the stem 520.

The elastic element 260 can be coupled between the valve 200 and the housing cover 300 or housing 600 and can serve to return the nozzle 100, valve 200, and guide 500 to their original positions by way of an elastic force when the external force applied by the user is removed. An elastic element 260 based on an embodiment of the invention can be made from a material capable of elastic deformation and can be shaped as a hollow tube overall. The upper portion 270 of the elastic element 260 can be coupled to the valve 200, for example by being inserted into the connection groove 220 of the head part 210, etc., and a lower portion 290 of the elastic element 260 can be coupled to the housing cover 300 or housing 600 by a similar method. The drawings illustrate an example in which a portion of the housing cover 300 is inserted to the inner side of the lower portion 290 of the elastic element 260.

A reinforcement rib 280 can be formed in the middle of the elastic element 260. The reinforcement rib 280, which may be a portion that is formed with a greater thickness to limit the elastic deformation, can enable the elastic element 260 to provide a restoring force more effectively by preventing folding, buckling, etc., in a portion of the elastic element 260.

The housing cover 300 can be coupled to an upper portion of the housing 600 to increase airtightness between the valve 200 and the housing 600. The housing cover 300 can include a head part 310 that is located at the top and a contact part 330 that extends to a particular length along the vertical direction. The head part 310 of the housing cover 300 can protrude outwardly from the upper end of the housing cover 300 and extend downward so as to form a connection groove 320. An upper portion of the housing 600 can be inserted in and secured to the connection groove 320 of the housing cover 300. The cylinder part 240 of the valve 200 can be configured to move up and down within the housing 600, where the cylinder part 240 can be inserted through the center hole of the contact part 330. The tight contact between the valve 200 and the housing cover 300, provided in the form of surface contact over the vertical length of the contact part 330, can provide a high level of airtightness for maintaining separated pressure environments in the interior of the housing 600 and in the pump space 650.

The piston 400 can be mounted onto the stem 520 of the guide 500 and can include an outer contact part 410, a bridge 420, and an inner contact part 430. The outer contact part 410 can be configured to tightly contact the inner perimeter of the housing 600, and the inner contact part 430 can be configured to contact the stem 520 of the guide 500. The bridge 420 can connect the outer contact part 410 and the inner contact part 430 with each other. When the nozzle 100 is not pressed, the piston 400 can be arranged at a position that closes the pump inflow holes 540 formed in the guide 500.

The guide 500 can be coupled to the valve 200 and can be configured to move up and down within the housing 600 according to the force applied by the user. The guide 500 can include a head part 510 and a stem 520. The head part 510 can be positioned within the pump space 650 of the housing 600 and can have a larger diameter than that of the piston 400, thereby forming a curb below the piston 400. The stem 520 can be elongated and can have the shape of a hollow cylinder through which a guide passage 550 may be formed, where one or more pump inflow holes 540 formed in the stem 520 can connect the guide passage 550 with the outside of the guide 500.

The disk 530 can be arranged at a lower portion of the housing 600 and can include multiple holes, so that even when the guide 500 is moved down as far as possible, the housing inflow hole 630 in the bottom of the housing 600 remains unclosed.

The housing 600 can form a pump space 650, into which the content can be suctioned and in which the piston 400 and guide 500 may move up and down. The housing 600 can include a flange 610 and a body 620. The body 620 of the housing 600 can be inserted into the holding space 850 of the inner cap 800, and the pump space 650 can be formed inside the body 620. One or more housing inflow hole 630 can be formed in a designated position in a lower portion of the body 620. The flange 610 can protrude outward from an upper portion of the housing 600 and can facilitate the coupling of the housing 600 onto the connector part 750.

When the user presses the nozzle 100, the nozzle 100 as well as the valve 200 and guide 500 coupled to the nozzle 100 may move down together, whereas the piston 400 may not move down immediately, due to the friction caused by the tight contact with the housing 600. As the piston 400 does not move down but the guide 500 does move down, the pump inflow holes 540 of the guide 500 can be opened. After the guide 500 has moved down by a particular distance, the lower end of the valve 200 can press the bridge 420 of the piston 400 and cause the piston 400 to move down together, but at this time, the pump inflow holes 540 of the guide 500 can maintain opened states. As the guide 500 moves downward, the volume of the pump space 650 can be decreased, and the resulting increase in pressure can suction the content (not shown), which was previously drawn into the pump space 650, through the opened pump inflow holes 540. The content that enters the pump inflow holes 540 can pass through the guide passage 550, valve space 250, nozzle space 150, and nozzle passage 140 and be dispensed through the dispensing hole 130.

When the user stops pressing on the nozzle 100, the nozzle 100 as well as the valve 200 and guide 500 coupled to the nozzle 100 may be moved up together by the restoring force of the elastic element 260, but once again, the piston 400 may not move up immediately, due to the friction caused by the tight contact with the housing 600. As the piston 400 does not move up but the guide 500 does move up, the pump inflow holes 540 of the guide 500 can be closed. After the guide 500 has moved up by a particular distance, the head part 510 of the guide 500 can press the piston 400 and cause the piston 400 to move up together, but at this time, the pump inflow holes 540 of the guide 500 can maintain closed states. As the guide 500 moves upward, the volume of the pump space 650 can be increased, and the resulting decrease in pressure can draw the content (not shown) of the filling space 905 through the supply channel into the pump space 650.

Some of the components of the pump part 450 can be combined into a single integrated body as long as such integration does not inhibit the operations described above.

The following provides a more detailed description of the bottle part 950 of a tubeless dispenser container 1000 according to an embodiment of the invention.

Figure 4:
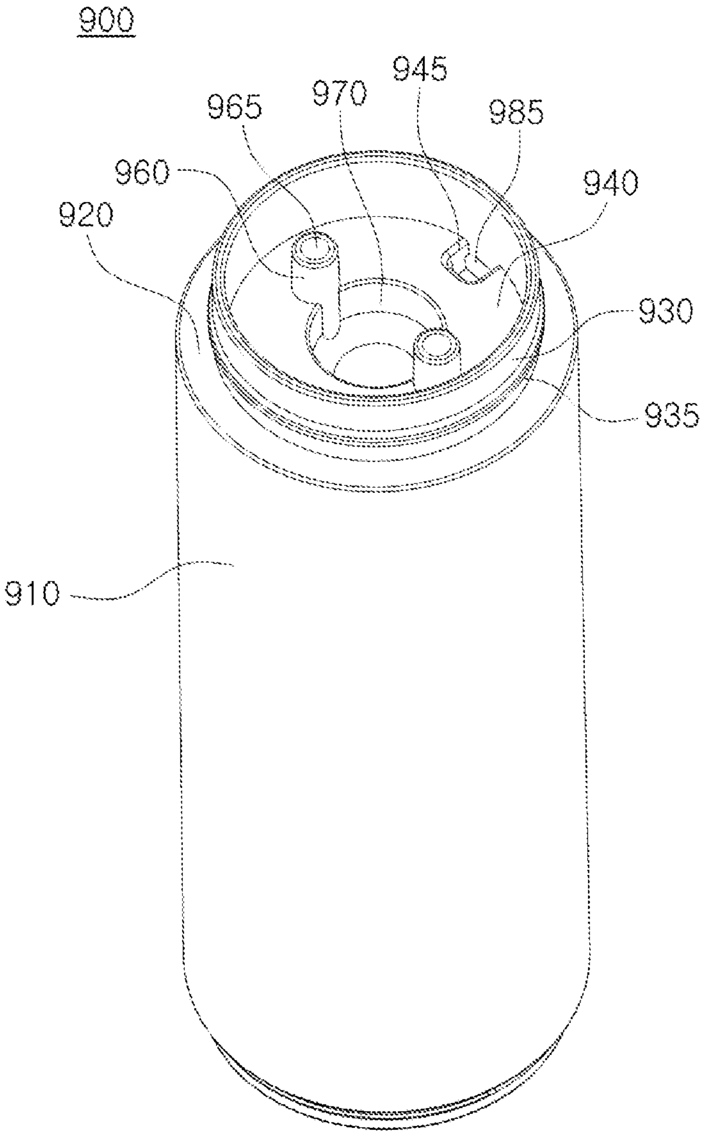
FIG. 4 is a perspective view of the bottle body of the tubeless dispenser container illustrated in FIG. 1 as seen from above.
Figure 5:
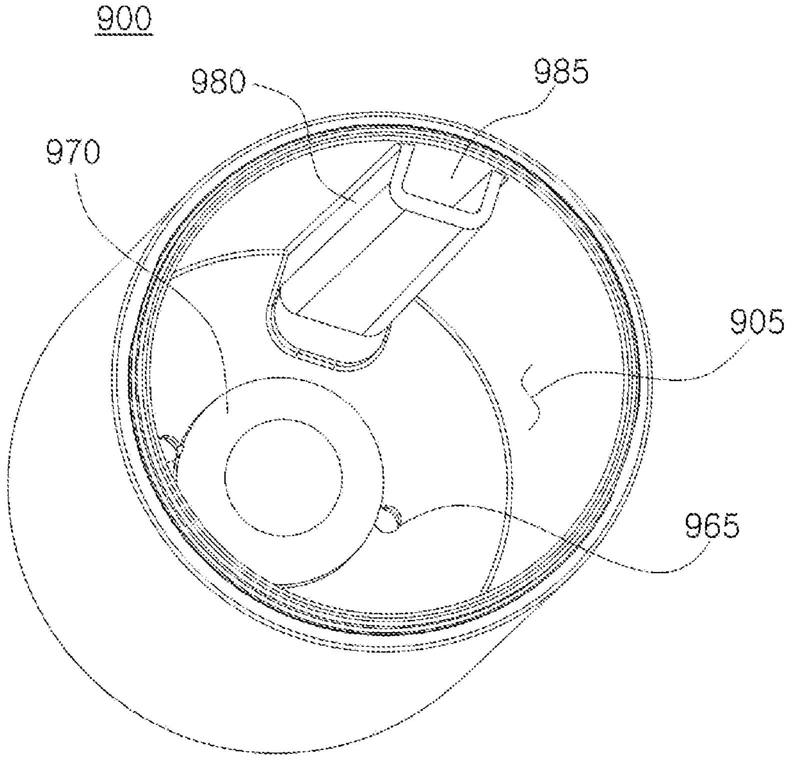
FIG. 5 is a perspective view of the bottle body illustrated in FIG. 4 as seen from below.

FIG. 4 and FIG. 5 are perspective views of the bottle body 900 of the tubeless dispenser container 1000 according to an embodiment of the invention as seen from above and below, respectively.

Referring to FIGS. 2 to 5, the bottle part 950 can include a bottle body 900 and a base 990. The bottle body 900 can have the shape of a hollow cylinder overall, with the filling space 905 formed therein and with an open bottom. The base 990 can be coupled to the open bottom of the bottle body 900.

The bottle body 900 may correspond to the main portion of the bottle part 950 and can form the filling space 905 on the inside. The bottle body 900 can have a supply hole 945, for permitting the flow of the content, and air holes 965, for permitting the inflow of air, formed in the upper surface. A channel part 980 can be formed on the inner wall on one side within the bottle body 900, where the channel part 980 can have a hollow interior to form a bottle channel 985.

The channel part 980 can have one end opening to a lower portion of the filling space 905 and can have the other end opening to the upper surface of the bottle body 900 by way of the supply hole 945. Thus, the bottle channel 985 can be formed such that one end connects to a lower portion of the filling space 905 and the other end connects with the supply hole 945 at an upper portion of the bottle part 950. As mentioned above, while there is content (not shown) filled within the filling space 905, the air holes 965 can be positioned above the surface of the content (not shown), and the one end of the bottle channel 985 can be positioned below the surface of the content (not shown), with respect to the surface of the liquid phase or gel phase content (not shown). Thus, until the content (not shown) is used up, the flow path for the content and the flow path for air can be spatially separated by the content itself, allowing the two different flow paths to have different pressure conditions.

The base 990 can be coupled to the open bottom of the bottle body 900. Depending on the embodiment, the base 990 can be detachably coupled or fixedly coupled by thermal fusion, etc., or can be configured to be rotatable even after being coupled.

When the base 990 is coupled to the bottom of the bottle body 900, a certain gap can be formed between a lower portion of the channel part 980 and the lower surface of the base 990, so that the lower end of the bottle channel 985 can be open towards the filling space 905. When the content of the filling space 905 is to be drawn into the pump space 650, the content in the filling space 905 can be drawn into the bottle channel 985 through the opening in the lower portion of the channel part 980, moved up through the channel part 980 by the negative pressure, drawn through the supply hole 945 and into the recessed part 970, and finally drawn through the housing inflow hole 630 and into the pump space 650.

Referring to FIG. 4 and FIG. 5, the bottle body 900 can include a perimeter part 910, a ledge 920, a mounting rim 930, an upper surface 940, airduct protrusions 960, a recessed part 970, and a channel part 980.

The perimeter part 910 of the bottle body 900 can correspond to the side portion of the bottle body 900 and can form the filling space 905 on its inside. The channel part 980 formed on the inner surface of the perimeter part 910 can, together with the inner surface of the perimeter part 910, form the bottle channel 985. While the drawings illustrate an example in which the perimeter part 910 has a cylindrical shape with a constant outer diameter and constant inner diameter, the invention is not limited thus, and the perimeter part 910 can employ any of a variety of shapes that allows the bottle channel 985 to maintain a particular cross-sectional area. In one embodiment of the invention, the perimeter part 910 can be formed from a completely transparent or semi-transparent material.

The perimeter part 910 can have a blocked top, which may thus form the upper surface 940, and a mounting rim 930 can be formed on the upper surface 940. The ledge 920 of the bottle body 900 may be the portion formed on the outside of the mounting rim 930. The ledge 920 can have the same height as the upper surface 940 or can have a different height. When the pump cap 700 and the overcap 10 are coupled to the bottle body 900, the lower ends of the pump cap 700 and overcap 10 can contact the ledge 920 of the bottle body 900.

The mounting rim 930 can have an annular shape and can protrude by a particular length from the upper surface 940 of the bottle body 900. The mounting rim 930 can be placed in tight contact with the connector part 750 in order to seal the supply channel as well as to couple the connector part 750 onto the bottle part 950. The outer perimeter of the mounting rim 930 can be provided with a protrusion 935 for coupling and sealing the connector part 750.

The upper surface 940 of the bottle body 900 can correspond to the block top of the perimeter part 910. The upper surface 940 can have the same height as the ledge 920 or can have a different height. The supply hole 945 formed in the upper surface 940 can connect with the open top of the channel part 980. The air holes 965 can also be formed in the upper surface 940, where the air holes 965 can connect directly with the filling space 905 below the upper surface 940 to allow an inflow of air. The airduct protrusions 960 and the recessed part 970 can also be provided on the upper surface 940 of the bottle body 900.

The airduct protrusions 960 can protrude upward to a particular length from the upper surface 940 of the bottle body 900. The airduct protrusions 960 can be formed in the shape of a hollow cylinder, where the passages inside the airduct protrusions 960 can connect with the air holes 965. That is, the passage inside an airduct protrusion 960 can be regarded as an extension of an air hole 965.

A recessed part 970 can be formed in the upper surface 940 of the bottle body 900. The recessed part 970 can be formed in correspondence to the position of the pump part 450 so as to hold portions of the pump part 450 and the connector part 750. Of course, in certain embodiments, the recessed part 970 can be omitted or implemented as another structure.

Within the bottle body 900, a channel part 980 can be formed on one side. The channel part 980 can form a bottle channel 985 therein, where the channel part 980 can be open only at the lower end and upper end so as to separate the bottle channel 985 from the filling space 905. The channel part 980 can be structured such that a lower entrance of channel part 980 can be opened even when the base 990 is couple to the bottom of the bottle body 900. To this end, the channel part 980 can extend to a length that leaves a gap between the lower entrance of the channel part 980 and the lower surface of the base 990. For example, the lower end of the channel part 980 can be positioned slightly higher than the lower end of the bottle body 900, or the lower end of the channel part 980 can be positioned at the same height as the lower end of the bottle body 900 but with the side surface of the base 990 coupling to the bottom of the bottle body 900 at a higher position than the lower surface of the base 990. In certain embodiments, the lower entrance of the channel part 980 can be formed in a side surface of the channel part 980 instead of the bottom surface of the channel part 980.

When the content of the filling space 905 is to be drawn into the pump space 650, the negative pressure formed in the pump space 650 can suction the content in the filling space 905 through the bottle channel 985 of the channel part 980, and the content can be moved up along the channel part 980, drawn through the supply hole 945 and into the recessed part 970, and drawn through the housing inflow hole 630 and into the pump space 650.

Although the drawings illustrate an example in which just one channel part 980 is formed in the bottle body 900, it is possible to form a multiple number of channel parts 980 and a multiple number of bottle channels 985 in the bottle body 900. For example, for a bottle body 900 that has two air holes 965 formed in the upper surface 940 as in the illustrated drawings, it would be possible to form two supply holes 945, in positions staggered by 90 degrees from the air holes 965 with respect to the center of the upper surface 940, and form two channel parts 980 that connect to the two supply holes 945.

Coupling the base 990 to the open bottom of the bottle body 900 can complete the bottle part 950. As the base 990 is coupled to the bottom of the bottle body 900, there is no need to form an opening for filling the content in an upper portion of the bottle body 900. This can eliminate the possibility of air infiltrating through paths around an opening, which would otherwise be required. The paths of air infiltration at the bottom of the bottle body 900 can basically be blocked by the content itself, and a level of airtightness that does not result in any leakage of the content would be sufficient.

Figure 6:
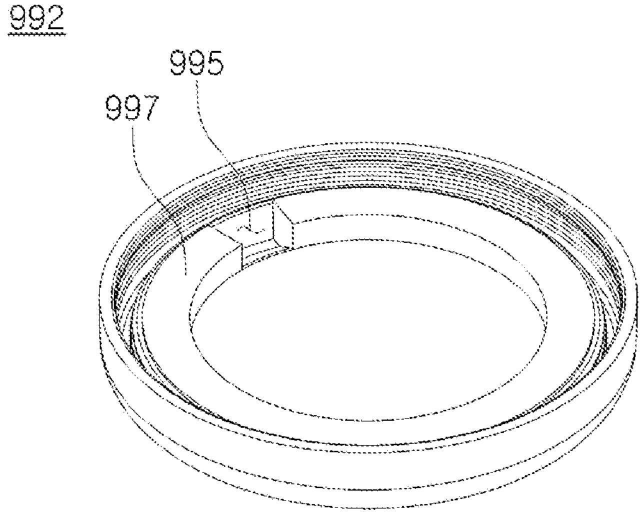
FIG. 6 is a perspective view illustrating the base of a tubeless dispenser container according to a second disclosed embodiment of the invention.

FIG. 6 is a perspective view illustrating the base 992 of a tubeless dispenser container 1000 according to a second disclosed embodiment of the invention.

The base 992 illustrated in FIG. 6 can be rotatably coupled to the bottle body 900. That is, the base 992 can be configured such that, even after the base 992 is coupled to the bottom of the bottle body 900, the base 992 is able to rotate in relation to the bottle body 900 without being detached from the bottle body 900 or allowing any leakage of the content.

In this type of base 992, a protruding curb 997 can be formed along the edge of the inside lower surface, and one or more inflow indentations 995 can be formed in designated positions of the protruding curb 997. The protruding curb 997 can be implemented in a form protruding to a particular height above the inside lower surface of the base 992, and the inflow indentation 995 can correspond to a gap where the protruding curb 997 does not protrude from the inside lower surface of the base 992.

According to this embodiment, the channel part 980 can be structured such that the lower entrance is open downwards, and the protruding curb 997 can protrude to a height corresponding to the lower entrance of the channel part 980. When a user uses a tubeless dispenser container 1000 having a base 992 according to this embodiment, the user can rotate the base 992 of the bottle part 950, and depending on the rotated angle of the base 992, either the protruding curb 997 or the inflow indentation 995 can be positioned at the lower entrance of the channel part 980. If the protruding curb 997 is positioned at the lower entrance of the channel part 980, the protruding curb 997 can close the lower entrance and prevent the content from entering the pump space 650. However, if the inflow indentation 995 is positioned at the lower entrance of the channel part 980, the inflow indentation 995 can keep the lower entrance of the channel part 980 open, thereby permitting the content to enter the pump space 650 as the dispenser container 1000 is used.

Figure 7:
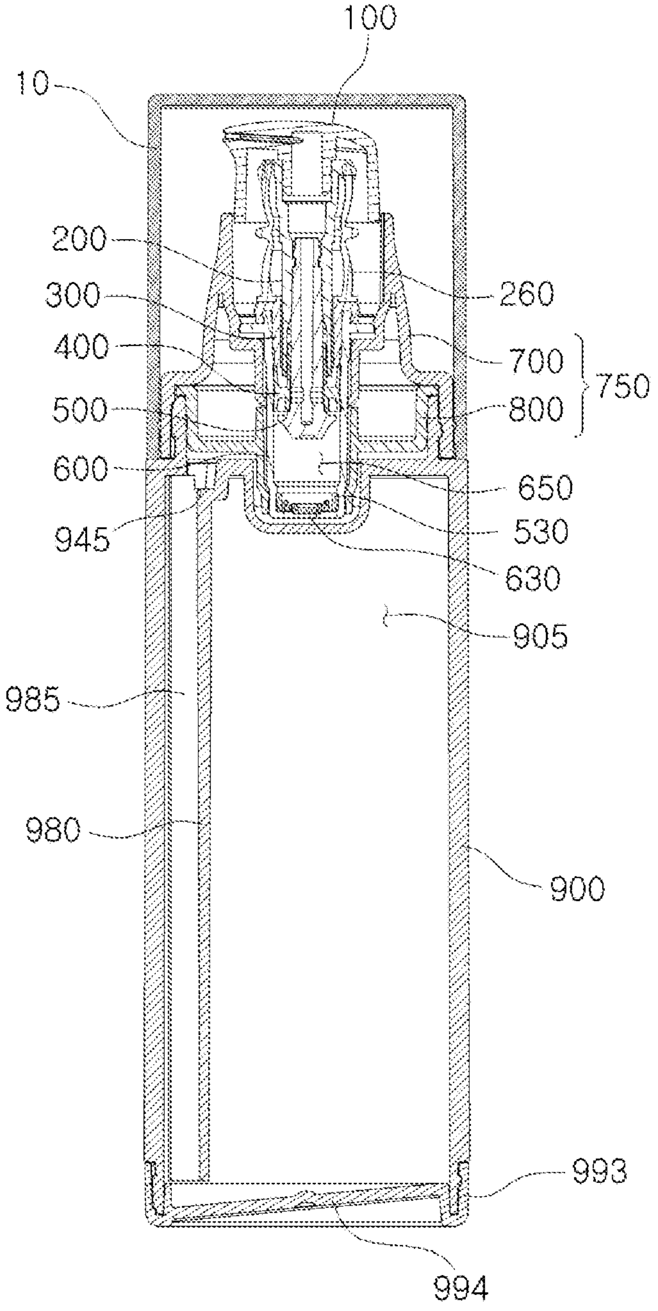
FIG. 7 is a cross-sectional view illustrating a tubeless dispenser container according to a third disclosed embodiment of the invention.

FIG. 7 is a cross-sectional view illustrating a tubeless dispenser container according to a third disclosed embodiment of the invention. The base 993 illustrated in FIG. 7 can be fixedly secured to the bottle body 900 and can be configured such that the lower surface 994 is inclined. That is, in cases where the channel part 980 is formed on just one side of the bottle body 900 as in FIG. 7, the inside lower surface 994 of the base 993 can have a downward incline towards the side where the channel part 980 is provided.

As mentioned above, it is necessary to separate the supply channel for the content (not shown) from the path of inflow for air into the filling space 905, and inside the filling space 905, the content (not shown) itself may serve to separate the supply channel from the path of air inflow. As one end of the bottle channel 985 is positioned below the surface of the content (not shown), air cannot enter the supply channel of the content (not shown). However, as the tubeless dispenser container 1000 is used more and more, the surface of the content will gradually be lowered, and when the content within the filling space 905 is almost exhausted after an extended period of use, it may occur that the lower entrance of the channel part 980 becomes exposed above the surface of the content. In this case, the vacuum within the supply channel would be broken, and the pump part 450 would no longer be able to operate properly.

In this embodiment, the inside lower surface 994 of the base 993 can be made to incline downwards toward the lower entrance of the channel part 980, so that the content within the filling space 905 may be directed towards the bottle channel 985. Compared to a base 990, 992 having the inside lower surface formed in a horizontally flat shape, the base 993 having the inside lower surface 994 inclined downward towards the lower entrance of the channel part 980 can delay the exposure of the lower entrance of the channel part 980 above the surface of the content, even when there is smaller amount of content remaining in the filling space 905, thereby helping the user to completely use up the content.

FIG. 7 assumes an example in which there is only one channel part 980 formed in the bottle body 900 and thus illustrates the lower surface 994 of the base 993 as having a downward incline in one direction only. However, in cases where there are two channel parts 980 formed in the bottle body 900, for example, the base 993 can be formed such that the lower surface 994 has a downward incline towards the position of each of the channel parts 980.

A tubeless dispenser container 1000 according to an embodiment of the invention may have the container itself provide the supply channel instead of using a plastic tube, and therefore a high level of airtightness between the flow path of the content and the flow path of the air is required throughout the structure of the tubeless dispenser container 1000. The following provides a more detailed description of the structure of the connector part 750, which allows a tubeless dispenser container 1000 according to an embodiment of the invention to maintain a high level of airtightness.

Figure 8A:
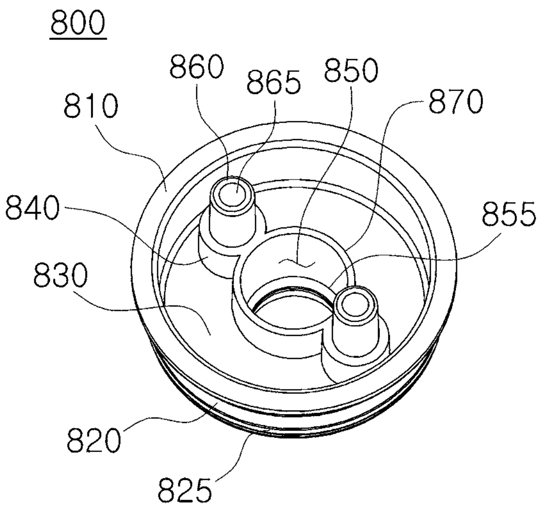
FIG. 8A and FIG. 8B are perspective views of the inner cap of the tubeless dispenser container illustrated in FIG. 1.
Figure 8B:
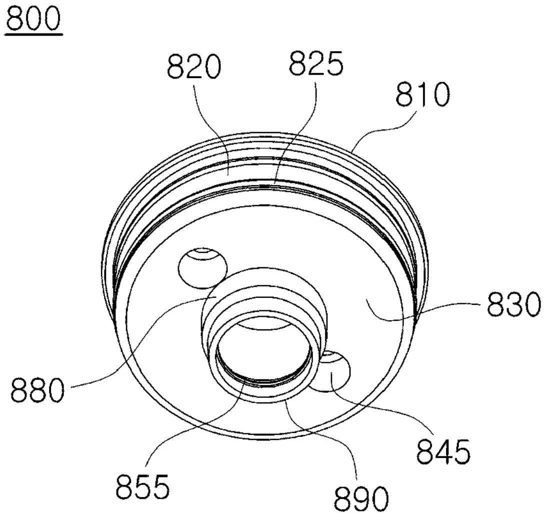
Figure 9A:
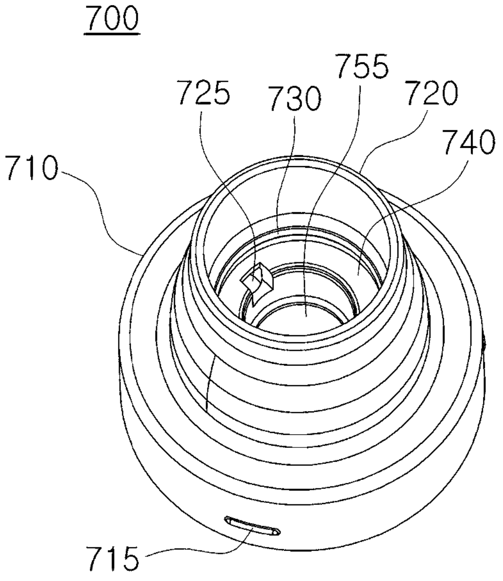
FIG. 9A and FIG. 9B are perspective views of the pump cap of the tubeless dispenser container illustrated in FIG. 1.
Figure 9B:
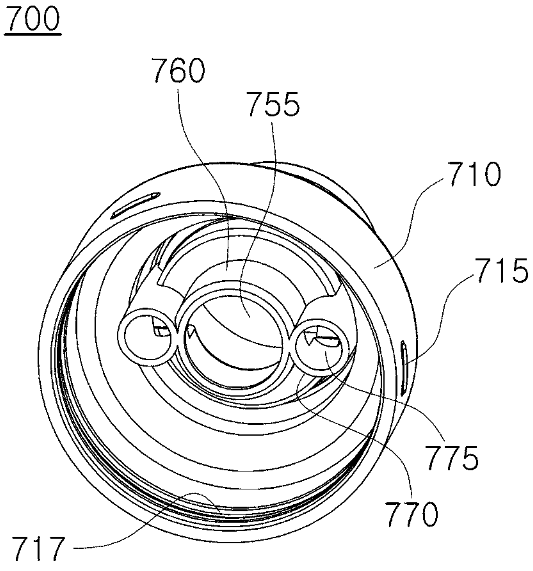

FIG. 8A and FIG. 8B are perspective views of the inner cap 800 of a tubeless dispenser container 1000 according to an embodiment of the invention, and FIG. 9A and FIG. 9B are perspective views of the pump cap 700 of a tubeless dispenser container 1000 according to an embodiment of the invention.

Referring to FIGS. 8A and 8B, the inner cap 800 of a tubeless dispenser container 1000 based on an embodiment of the invention can mainly include a flat part 830 that is shaped as a circular plate, a contact rim 820 that extends upward from the edge of the flat part 830, a flange 810 that extends outward from an upper portion of the contact rim 820, insertion parts 840 and protrusion parts 860 that protrude upward from the flat part 830, and holding parts 870, 880 that protrude upward and downward from the middle of the flat part 830.

The flat part 830 can be implemented in the shape of a circular plate and can be implemented in a size corresponding to the area of the upper surface of the bottle body 900 inside the mounting rim 930. The contact rim 820 can extend upward from the edge of the flat part 830, and the flange 810 can be formed extending outward from the end portion of the contact rim 820.

The outer diameter of the contact rim 820 can be formed in a size corresponding to the inner diameter of the mounting rim 930 of the bottle body 900. Thus, the inner cap 800 can be coupled to an upper portion of the bottle body 900 by way of force-fitting into the inside of the mounting rim 930, as a result of which the outer perimeter of the contact rim 820 can tightly contact the inner perimeter of the mounting rim 930. To provide increased airtightness, one or more sealing protrusions 825 can be formed on the outer perimeter of the contact rim 820. The extending length of the contact rim 820 can be made slightly shorter than the extending length of the mounting rim 930. Thus, when the inner cap 800 is mounted on the bottle body 900, the flange 810 of the inner cap 800 can be caught on an upper portion of the mounting rim 930, and the flat part 830 may not tightly contact the upper surface of the bottle body 900. The resulting gap between the flat part 830 and the upper surface of the bottle body 900 can form a portion of the supply channel between the supply hole 945 and the recessed part 970.

An insertion part 840 can protrude upward from the flat part 830 and can have the shape of a hollow cylinder, forming an insertion cavity 845 therein that opens downward. A protrusion part 860 having the shape of a hollow cylinder can be formed at an upper portion of the insertion part 840, where the passage 865 of the protrusion part 860 can connect with the insertion cavity 845. However, the insertion cavity 845 can be formed with an inner diameter that is greater than the inner diameter of the passage 865 of the protrusion part 860.

When the inner cap 800 is mounted on the bottle body 900, the airduct protrusions 960 of the bottle body 900 can be force-fitted into the insertion cavities 845, and the outer perimeters of the airduct protrusions 960 can be placed in tight contact with the inner perimeters of the insertion parts 840. In this state, the passages of the airduct protrusions 960 (i.e., the air holes 965) can connect with the passages 865 of the protrusion parts 860. Thus, the protrusion parts 860 can be regarded as extensions of the airduct protrusions 960. The inner diameters of the insertion parts 840 can correspond to the outer diameters of the airduct protrusions 960, and the inner diameters of the protrusion parts 860 can correspond to the inner diameters of the airduct protrusions 960.

In a structure requiring airtightness, one of the positions where undesired air infiltration is most likely to occur is at the boundaries between components. Since a tubeless dispenser container 1000 according to an embodiment of the invention requires airflow at the air holes 965 connecting to the filling space 905 but requires a thorough blocking of airflow at other portions, airtight sealing around the airduct protrusions 960 of the bottle body 900 is especially important. By having the airduct protrusions 960 extend a particular length and be force-fitted into the insertion cavities 845 of a particular depth, the boundary between the inner cap 800 and the bottle body 900 formed around the airduct protrusions 960 can be increased in length. Thus, the potential paths for air infiltration at the boundary between the inner cap 800 and the bottle body 900 can be blocked by surface contact over a large distance, thus effectively blocking any undesired air infiltration.

The holding parts 870, 880 can protrude upward and downward with respect to the flat part 830 and can have a hollow inside to thereby form a holding space 850 therein. The holding part 870 formed above the flat part 830 can be open in an upward direction, while the holding part 880 formed below the flat part 830 can be open in a downward direction. The pump part 450 can be inserted and installed within the holding space 850. To facilitate the securing of and sealing around the pump part 450, one or more sealing protrusions 855 can be formed in the holding space 850.

The content that has been drawn from the filling space 905 and through the bottle channel 985 to arrive at the supply hole 945 can then move to recessed part 970 adjacent to the supply hole 945, pass through the space between the inner perimeter of the recessed part 970 and the outer perimeter of the holding part 880, and move through the housing inflow hole 630 that is exposed through the open bottom of the holding part 880, to subsequently move into the pump space 650.

Since a tubeless dispenser container 1000 according to an embodiment of the invention is structured such that the base 990 is coupled to the bottom of the bottle body 900, the content can be filled in the filling space 905 through the open bottom of the bottle body 900, and there is no need for a separate opening in the recessed part 970 for holding the pump part 450.

The lower surface of the flat part 830 of the inner cap 800 may form a part of the supply path for the content (not shown), and insertion cavities 845 forming the flow path for air may be formed in the lower surface of the flat part 830. However, since the air holes 965 connecting to the filling space 905 continue to the upper portions of the airduct protrusions 960, the air holes 965 may not be exposed at the lower surface of the flat part 830. That is, at the boundary from the exit of an air hole 965 to the lower surface of the flat part 830, the potential path of airflow may be blocked by surface contact over a length corresponding to the depth of the insertion cavity 845, whereby a high level of airtightness can be obtained, and the flow paths for the content and the air can be separated spatially.

Referring to FIGS. 9A and 9B, the pump cap 700 of a tubeless dispenser container 1000 based on an embodiment of the invention can mainly include an outer mounting part 710 and an inner mounting part 720.

The outer mounting part 710 can include a part formed in an annular shape and a part extending inward from the annularly shaped part. The outer mounting part 710 can be placed in tight contact with and be coupled to the outside of the mounting rim 930 of the bottle body 900. One or more protrusions 717 can be provided on the inner perimeter of the outer mounting part 710 to facilitate the coupling and sealing with respect to the mounting rim 930 of the bottle body 900. Also, one or more detent protrusions 715 can be provided on the outer perimeter of the outer mounting part 710 to allow a detachable coupling of the overcap 10.

The inner mounting part 720 can be formed extending with an incline in a frustoconical shape, and the nozzle 100 can be exposed at the open top. The inner mounting part 720 can provide a space for housing the pump part 450 and can secure the housing cover 300 and the nozzle 100.

On the inside of the inner mounting part 720, there can be formed a ledge part 740, which may protrude inward to provide a curb, as well as a securing part 760, which may protrude downward from the inner side of the ledge part 740. The securing part 760 can have the shape of a hollow cylinder and can form a through-hole 755 therein. As illustrated in FIGS. 9A and 9B, insertion parts 770 can also be formed on a lower portion of the ledge part 740, where the insertion parts 770 can have the shape of a hollow cylinder to form insertion cavities 775 therein. Cavities can be formed in designated locations of the ledge part 740, and the air holes 725 can be formed inside such cavities.

When the pump cap 700 and the inner cap 800 are coupled to each other, the protrusion part 860 of the inner cap 800 can be force-fitted into the insertion cavity 775 of the pump cap 700, and the outer perimeter of the protrusion part 860 can tightly contact the inner perimeter of the insertion part 770. In this state, the passages 865 of the protrusion parts 860 can be connected with the air holes 725 of the ledge part 740. Thus, the air holes 965 formed in the upper portion of the filling space 905 can be connected with the outside by way of the air holes 965 in the airduct protrusions 960 of the inner bottle 900, the passages 865 in the protrusion parts 860 of the inner cap 800, and the air holes 725 in the pump cap 700.

When the pump part 450 is coupled to the pump cap 700, the pump part 450 can be inserted through the through-hole 755 of the inner mounting part 720 and can be disposed within the recessed part 970 of the inner bottle 900 and the holding space 850 of the inner cap 800. When the pump part 450 is pressed and inserted with a sufficient force, the head part 310 of the housing cover 300 can be forced under the securing protrusion 730 of the ledge part 740, and the head part 310 can be secured between the ledge part 740 and the securing protrusion 730. Of course, in certain embodiments, the structure can be modified such that the head part 310 of the housing cover 300 is positioned between the pump cap 700 and the inner cap 800. However, the structure of the embodiment illustrated in the drawings can simplify the assembly process to thereby provide advantages in time and cost reduction.

Some of the components of the connector part 750, i.e., the pump cap 700 and inner cap 800, can be combined into a single integrated body as long as such integration does not inhibit the operations described above. However, these can also be fabricated separately and assembled together for easier manufacture and assembly.

Figure 10:
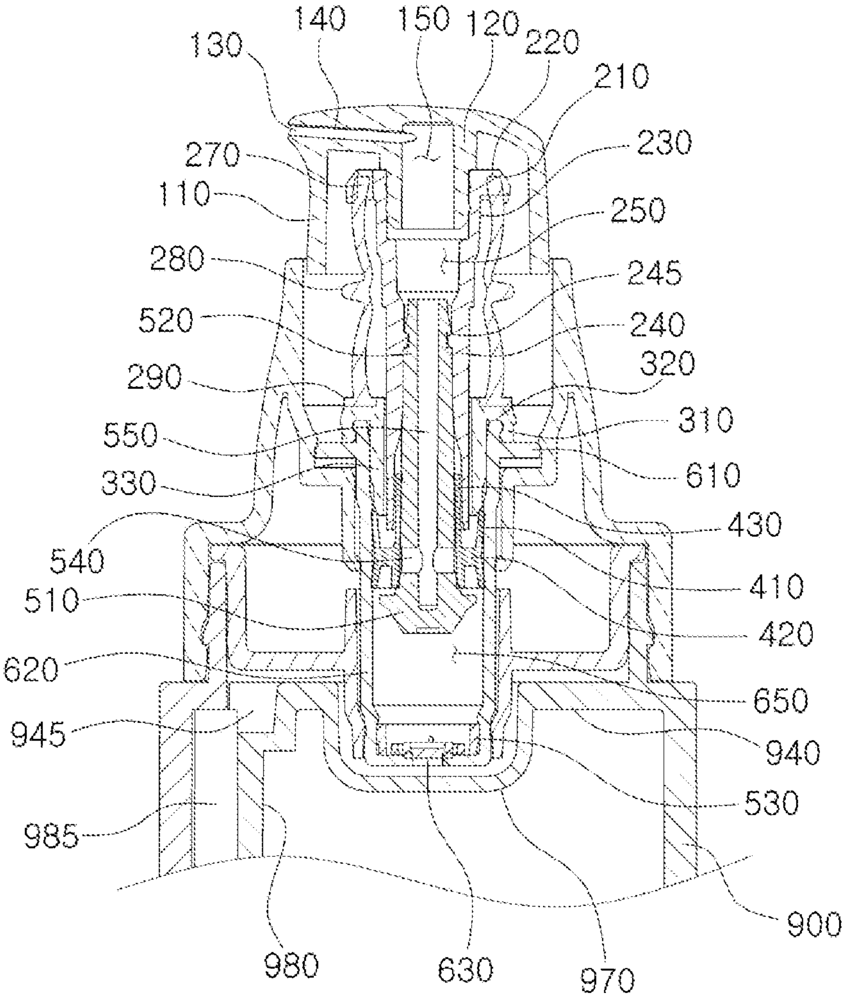
FIG. 10 is a cross-sectional view of a portion of the tubeless dispenser container illustrated in FIG. 1 as cut across line A-A'.
Figure 11:
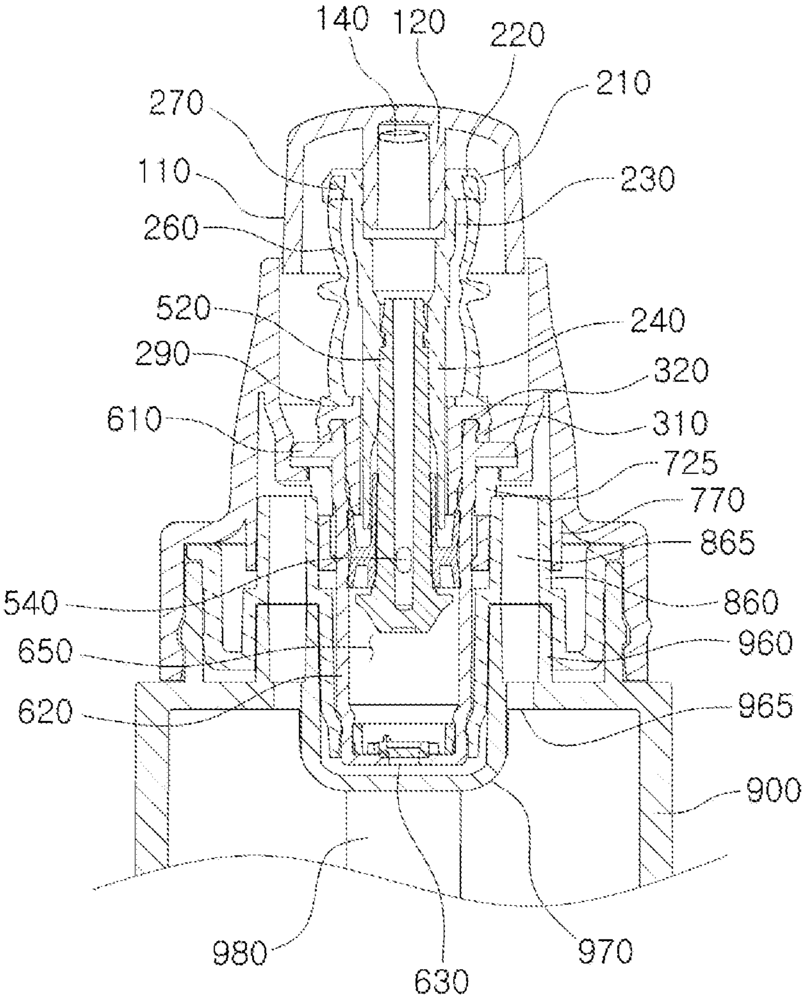
FIG. 11 is a cross-sectional view of a portion of the tubeless dispenser container illustrated in FIG. 1 as cut across line B-B'.

A more detailed description is provided below, with reference to FIG. 10 and FIG. 11, of the flow paths of the content and the air within a tubeless dispenser container 1000. FIG. 10 and FIG. 11 are cross-sectional views of a portion of the tubeless dispenser container 1000 illustrated in FIG. 1 across line A-A' and line B-B', respectively.

First, referring to FIG. 2 and FIG. 10, when the user presses the nozzle 100 from the state shown in FIG. 10 and subsequently stops pressing on the nozzle 100 so that a negative pressure is created within the pump space 650, the content (not shown) in the filling space 905 may move from the lower portion of the filling space 905 and through the bottle channel 985 inside the channel part 980 to arrive at the upper portion of the bottle body 900 and the supply hole 945 and may then enter the recessed part 970 and move through the housing inflow hole 630 to be supplied to the pump space 650. Later, when the nozzle 100 is pressed again, the content within the pump space 650 can pass through the pump part 450 to be dispensed through the dispensing hole 130 of the nozzle 100.

Referring to FIG. 11, the airduct protrusions 960 of the bottle body 900 may be inserted in the insertion cavities 845 of the inner cap 800, and the protrusion parts 860 of the inner cap 800 may be inserted in the insertion cavities 775 of the pump cap 700. As a result, the air holes 965 formed in the upper surface of the bottle body 900 can be connected, by way of the protrusion parts 860 of the inner cap 800 and the insertion parts 770 of the pump cap 700, with the air holes 725 in the inner mounting part 720 of the pump cap 700.

As presented above, a tubeless dispenser container 1000 according to an embodiment of the invention can provide a supply channel for the content using the structure of the container itself without using a separate plastic tube. Unlike conventional containers that use a separate plastic tube, a tubeless dispenser container 1000 according to an embodiment of the invention requires high airtightness at each component of the dispenser container and requires an effective prevention of air infiltration particularly at the contact boundaries between different components, as these are particularly vulnerable to air infiltration.

A tubeless dispenser container 1000 according to an embodiment of the invention includes a small number of components to begin with, some of which may be integrated into a single body to provide an even smaller number of components. As the container includes a small number of components, the boundaries between components can be decreased, and the risk of air infiltration can be greatly reduced. Also, as illustrated in FIGS. 10 and 11, a tubeless dispenser container 1000 according to an embodiment of the invention has the portions vulnerable to air infiltration blocked by surface contact over a particular length at the boundaries between the bottle body 900, inner cap 800, and pump cap 700. That is, members such as the mounting rim 930, protrusion parts 860, holding parts 870, 880, airduct protrusions 960, etc., extend beyond a particular length and provide surface contact over the entire extending length.

Such a structure can greatly enhance the airtightness at the contact boundaries between components, which can be particularly vulnerable to undesired air infiltration, thereby allowing the tubeless dispenser container 1000 to smoothly perform a dispensing function using the structure itself and without using a separate plastic tube. In the embodiments illustrated in the drawings, the structure described above can be omitted at certain portions, such as at the coupling portion between the bottle body 900 and the base 990, where airtightness can be easily obtained using other methods.

While the foregoing provides a description with reference to certain embodiments of the present invention, it should be appreciated that a person having ordinary skill in the relevant field of art would be able to make various modifications and alterations to the present invention without departing from the spirit and scope of the present invention set forth in the scope of claims below.

What is claimed is:

1. A tubeless dispenser container for dispensing a content held in a filling space, the tubeless dispenser container comprising:

a bottle part having the filling space formed therein and having a supply hole and an air hole formed in an upper surface thereof, the supply hole being configured to allow a flow of the content, the air hole being configured to allow an inflow of air;

a connector part coupled to an upper portion of the bottle part to spatially separate the supply hole from the air hole; and a pump part secured to a designated position of the connector part and configured to suction and dispense the content supplied through the supply hole, wherein the bottle part has a hollow channel part formed on an inner wall thereof at one side, the channel part having one end opening to a lower portion of the filling space and another end opening to an upper portion of the filling space, wherein the bottle part comprises:

a bottle body having the filling space formed therein, having an open bottom, and having the channel part formed on one side; and a base configured to be coupled to the open bottom of the bottle body, wherein a gap is formed between a lower entrance of the channel part and an inside lower surface of the base when the base is coupled to the bottom of the bottle body.

2. The tubeless dispenser container of claim 1, wherein the lower entrance of the channel part is formed in a side surface of the channel part.

3. The tubeless dispenser container of claim 1, wherein the inside lower surface of the base has a downward incline towards the one side where the lower entrance of the channel part is formed.

4. The tubeless dispenser container of claim 1, wherein the base is rotatably coupled to the open bottom of the bottle body, the base has a protruding curb of an upwardly protruding shape formed along an edge of the inside lower surface, the protruding curb having one or more inflow indentations in designated positions thereof where the protruding curb does not protrude upward from the inside lower surface of the base, and while the base is rotatably coupled to the open bottom of the bottle body, either the protruding curb closes the lower entrance of the channel part or the inflow indentation connects the lower entrance of the channel part with the filling space depending on a rotated angle of the base.

5. The tubeless dispenser container of claim 1, wherein the bottle part comprises an airduct protrusion, the airduct protrusion protruding upward in a particular length from the upper surface of the bottle part and forming a channel connecting with the air hole in an inside thereof, and the connector part comprises an insertion cavity, the insertion cavity being configured to receive the airduct protrusion force-fitted therein such that the insertion cavity contacts an outer perimeter of the airduct protrusion.

6. The tubeless dispenser container of claim 5, wherein, while the connector part is coupled to the upper portion of the bottle part, a bottom surface of the connector part is at least partially separated from the upper surface of the bottle part such that the content flowed out of the supply hole is supplied to the pump part through a space between the connector part and the bottle part.

7. The tubeless dispenser container of claim 1, wherein the bottle part comprises a mounting rim, the mounting rim having an annular shape and protruding upward in a particular length from the upper surface of the bottle part, and the connector part is configured to have a portion thereof force-fitted into an inner side of the mounting rim so as to contact an inner perimeter of the mounting rim.

8. The tubeless dispenser container of claim 7, wherein the connector part comprises an inner cap and a pump cap, the inner cap is configured to be force-fitted into the inner side of the mounting rim so as to contact the inner perimeter of the mounting rim, and the pump cap is configured to be mounted onto an outer side of the mounting rim to contact an outer perimeter of the mounting rim.

9. A tubeless dispenser container for dispensing a content held in a filling space, the tubeless dispenser container comprising:

a bottle part having the filling space formed therein and having a supply hole and an air hole formed in an upper surface thereof, the supply hole being configured to allow a flow of the content, the air hole being configured to allow an inflow of air;

a connector part coupled to an upper portion of the bottle part to spatially separate the supply hole from the air hole; and a pump part secured to a designated position of the connector part and configured to suction and dispense the content supplied through the supply hole, wherein the bottle part has a hollow channel part formed on an inner wall thereof at one side, the channel part having one end opening to a lower portion of the filling space and another end opening to an upper portion of the filling space, wherein the bottle part comprises an airduct protrusion, the airduct protrusion protruding upward in a particular length from the upper surface of the bottle part and forming a channel connecting with the air hole in an inside thereof, wherein the connector part comprises an insertion cavity, the insertion cavity being configured to receive the airduct protrusion force-fitted therein such that the insertion cavity contacts an outer perimeter of the airduct protrusion.

10. A tubeless dispenser container for dispensing a content held in a filling space, the tubeless dispenser container comprising:

a bottle part having the filling space formed therein and having a supply hole and an air hole formed in an upper surface thereof, the supply hole being configured to allow a flow of the content, the air hole being configured to allow an inflow of air;

a connector part coupled to an upper portion of the bottle part to spatially separate the supply hole from the air hole; and a pump part secured to a designated position of the connector part and configured to suction and dispense the content supplied through the supply hole, wherein the bottle part has a hollow channel part formed on an inner wall thereof at one side, the channel part having one end opening to a lower portion of the filling space and another end opening to an upper portion of the filling space, wherein the bottle part comprises a mounting rim, the mounting rim having an annular shape and protruding upward in a particular length from the upper surface of the bottle part, wherein the connector part is configured to have a portion thereof force-fitted into an inner side of the mounting rim so as to contact an inner perimeter of the mounting rim, wherein the connector part comprises an inner cap and a pump cap, wherein the inner cap is configured to be force-fitted into the inner side of the mounting rim so as to contact the inner perimeter of the mounting rim, and the pump cap is configured to be mounted onto an outer side of the mounting rim to contact an outer perimeter of the mounting rim.

* * * * *